United States Patent
Lyons et al.

(10) Patent No.: US 6,304,941 B1
(45) Date of Patent: Oct. 16, 2001

(54) METHOD AND APPARATUS FOR REDUCING PROCESSOR OPERATIONS WHEN ADDING A NEW DRIVE TO A RAID-6 DRIVE GROUP

(75) Inventors: Gary Robert Lyons, Leander; Jack Erwin Reeder, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/057,362

(22) Filed: Apr. 8, 1998

(51) Int. Cl.[7] .............. G06F 12/00; H02H 3/05; H03K 19/003; H05K 10/00
(52) U.S. Cl. .............. 711/114; 711/170; 714/5; 714/6; 714/7; 714/8
(58) Field of Search ...................... 711/114, 170, 711/112, 172, 173; 709/220, 221, 222, 213–215; 714/7, 6, 8, 5

(56) References Cited

U.S. PATENT DOCUMENTS

| | | | | |
|---|---|---|---|---|
| 5,502,836 | * | 3/1996 | Hale et al. | 395/497.01 |
| 5,574,851 | * | 11/1996 | Rathunde | 714/7 |
| 5,615,352 | * | 3/1997 | Jacobson et al. | 395/441 |
| 5,790,775 | * | 8/1998 | Marks et al. | 395/182.07 |
| 5,809,224 | * | 9/1998 | Schultz | 714/7 |
| 5,822,782 | * | 10/1998 | Humlicek et al. | 711/170 |
| 5,875,456 | * | 2/1999 | Stallmo et al. | 711/114 |
| 5,875,457 | * | 2/1999 | Shalit | 711/114 |
| 5,933,834 | * | 8/1999 | Aichelon | 707/103 |
| 5,991,804 | * | 11/1999 | Bolosky et al. | 709/221 |

* cited by examiner

Primary Examiner—Do Hyun Yoo
Assistant Examiner—Kimberly McLean
(74) Attorney, Agent, or Firm—Volel Emile; Bracewell & Patterson, L.L.P.

(57) ABSTRACT

A new drive installation to a multiple drive, drive group begins with a start command issued by the drive group controller to a new drive. The command is then propagated to every other drive. A successful completion reply is propagated back to the first drive and then to the controller. The controller transfers managing control to the new drive and the new drive reads the first data segment it needs; i.e., in a sixth drive addition to a five drive group, this is data segment six on drive one. The segment read by the new drive (drive six) is placed in the segment stack on the first drive (segment six of Drive 1 is read and Drive 1 places segment six on its segment stack). The process is repeated with each drive in the RAID device, in order. All drives consider their segment stack to determine if they have locations to read. As a segment is read on a drive, the segment is placed into the drive's segment stack and removed from the source drive as the segment is written to the target drive. After a few operations, multiple drives are reading and writing segments to target drives in parallel. The access to the controller is minimal and the functions are taking place in parallel, thereby reducing the drive group transactions with the controller and speeding up the installation process.

19 Claims, 6 Drawing Sheets

METHOD AND APPARATUS FOR REDUCING PROCESSOR OPERATIONS WHEN ADDING A NEW DRIVE TO A RAID-6 DRIVE GROUP

BACKGROUND OF THE INVENTION

1. Technical Field

The present invention relates in general to mapping a group of disk drives in a storage subsystem of a data processing system and in particular to the striping of data segments across individual drives. Still more particularly, the present invention relates to the method of striping data segments when a new drive is added to the drive group.

2. Description of the Related Art

Data processing systems store critical programs and data on magnetic disk drives for use during data processing. Often, the magnetic disk drives are large and only one drive is attached to the data processing system. Multiple disk drives are used to provide a more reliable and flexible data storage subsystem. In systems that require reliable access to the disk drives, the primary purposes for using multiple disk drives are for redundancy and to back up the primary storage drives. Storage subsystems with multiple drives can be a group of disk drives with no particular arrangement, or a configuration, with a specific controller, known as a disk array.

A disk array, which may also be referred to as a Redundant Array of Independent Drives ("RAID") device, and is used with a data processing system to increase data availability, increase storage capacity, provide performance flexibility and increase data protection. A data processing system's storage capacity is increased by installing multiple smaller form factor drives on a data processing system. A special memory subsystem controller is used that allows all the drives to appear as one drive to the data processing system.

Performance of the memory transactions may be enhanced by spreading segments of data over the multiple drives and then allowing multiple drives to work on a single request at the same time. However, as the number of drives on a system increases, the likelihood of a drive failing increases. So, copying data to multiple locations increases safety of the data. Also, disk mirroring (copying an exact copy of one disk onto another) and various encoding schemes may be used to reduce the required redundancy.

RAID drive groups that have the data segments written in "stripes" (a continuous segment of data written to multiple drives), improve performance by mapping what the system believes are contiguous data segments across several physical drives. Data Striping is a physical mapping of data that is supported by most RAID classes (RAID 0, 1, 5 and 6). For example, in a five drive RAID device, when a system requests four contiguous data segments from a drive-group that supports data striping, the four data segments may actually be written to four different physical drives. The data, resident on four different drives, may be retrieved in a parallel operation which increases access and speed between the data processing system and the RAID device.

The problem with data striping is that since striping is a physical mapping of the data segments, adding a new drive to the drive group is fairly complex. Each data segment already present on the old drives must be remapped to a new position. For example, if a new drive is added to a five drive drive-group, then data segment 6, which exists on the first drive in the drive group hierarchy, must be copied to the first stripe on the new drive. Data segment 7, which exists on the second drive, must then be copied to the second segment on the first drive. This continues until all of the segments on all of the drives have been remapped to new positions.

If the drives are 4 gigabyte drives with 256K sized data segments, then the controller managing the drive group must issue over 142,000 commands to expand the 5 drive drive-group by one drive. During this time, the processor will be consumed with handling every read and write operation, and I/O throughput will essentially halt.

It would be desirable, therefore, to provide a method for reducing the number of transactions between the controller and the connected RAID device.

It would also be desirable, to provide a method that will the reduce the time required to install a new drive to a RAID subsystem.

It would be desirable further, to provide a method that will transfer the new drive installation functions to the RAID subsystem.

SUMMARY OF THE INVENTION

It is therefore one object of the present invention to provide a method that will reduce the number of transactions that take place between the RAID subsystem controller and the RAID device during the installation of a new drive.

It is another object of the present invention to provide a method that will reduce the time required to install a new drive to a RAID device by providing a management process to allow multiple drive processors to accomplish the installation.

It is yet another object of the present invention to provide a method that will transfer installation commands to the RAID device.

The foregoing objects are achieved as is now described. A new drive installation to a multiple drive, drive group begins with a start command issued by the drive group controller to a new drive. The command is then propagated to every other drive. A successful completion reply is propagated back to the first drive and then to the controller. The controller transfers managing control to the new drive and the new drive reads the first required data segment as determined by the algorithm "AN," where A=the number of the data segment being read and N=the total number of drives in the drive group. For example, in a sixth drive addition to a five drive group, this is data segment six on drive one (A=first data segment to be read for the new drive and N=6 drives; 1(6)=6). The segment read by the new drive (drive six) is placed in the segment stack on the first drive (segment six of Drive 1 is read and Drive 1 places segment six on its segment stack). The operation is repeated with each drive in the RAID device, in order. All drives consider their segment stack to determine if they have locations to read. As a segment is read on a drive, the segment is placed into the drive's segment stack and removed from the source drive as the segment is written to the target drive. After a few operations, multiple drives are reading and writing segments to target drives in parallel. The access to the controller is minimal and the functions are taking place in parallel, thereby reducing the drive group transactions with the controller and speeding up the installation process.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
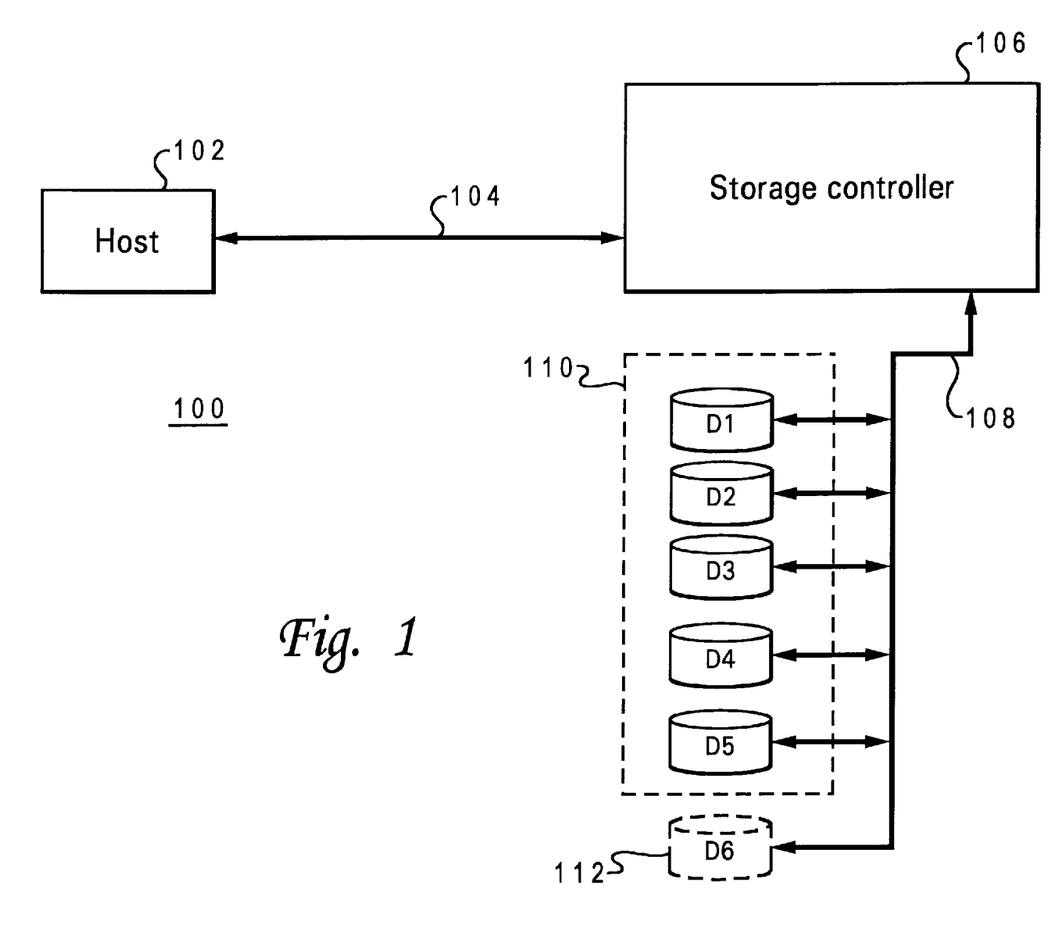
FIG. 1 depicts a high level block diagram of a data processing system with a RAID device in which a preferred embodiment of the present invention may be implemented.

With reference now to the figures, and in particular with reference to FIG. 1, a high level block diagram of a data processing system 100 is depicted, in which a preferred embodiment of the present invention may be implemented. The exemplary embodiment depicted includes a host system ("host") 102, internal bus 104 for communication between host 102 and controller 106 for controlling Redundant Array of Independent Drives ("RAID") device 110, external bus 108 connected to controller 106 and RAID device 110. Included in the RAID device 110 is Drive 6 112, a new drive to be installed. Host 102 communicates directly with controller 104 when accessing the data processing system 100 memory subsystem; in this instance, the RAID device 110. Controller 104 communicates the host 102 transactions to RAID device 110, whereas host 102 perceives RAID device 110 as a large, single drive. Controller 106 implements commands and data transfers in RAID device 110 to install new drive 112 in RAID device 110. Controller 106 may also install new drive 112 by implementing the procedure in accordance with a preferred embodiment of the present invention, as described in further detail below.

Referring to FIGS. 2A–2D, a RAID device in which a new drive is added showing several read and write operations in accordance with a preferred embodiment of the present invention is illustrated. FIG. 1 should be read together with FIGS. 2A–2D. Drives within RAID device 110 are labeled Drive 1, Drive 2, etc., through Drive 6. Data segments are stored on the drives in contiguous stripes. The stripes are designated Stripe 1, Stripe 2, etc. through Stripe 4, there being more stripes on the drives than are depicted here. Additionally, segment stacks are shown for each drive and are called segment_stack 1, segment_stack 2, etc., through segment_stack 6.

Due to the fact that there are many different drive types and command formats, generic function calls will be used to represent a command that is passed across external bus 108. The first command will be called start( ) and it will pass a single parameter. This parameter called "drive group," will list every drive, by its address, that belongs to the striped list of drives. The order of the list is in reverse order of the drives in RAID device 110. For example, if RAID device 110 contains 5 drives, each with a drive address ranging from 1 to 5, a new drive will be located at drive address 6. The order of the drives in the RAID device 110, beginning with the new drive, should be 6, 5, 4, 3, 2, 1. The first drive in the drive group parameter should always be the new drive. When the start( ) command is received, every drive will compare its address to the first address in RAID device 110 to determine if it is the new drive.

Once the new drive, Drive 6 receives the start(drive group) command, Drive 6 will check to determine whether it is able to properly execute a stripe expansion. If it is able to execute a stripe expansion, Drive 6 will look at the drive group parameter list, and issue a start(drive group) command to the drive following Drive 6 in the drive group address list. In the five drive RAID device 110, controller 106 issues a start(drive group) command to Drive 6. Drive 6 then issues a start(drive group) command to Drive 5. This process continues until the start(drive group) command is issued to the last drive, in this case Drive 1, in RAID device 110.

When the last drive, Drive 1 in RAID device 110 receives the start(drive group) command, and verifies that it can execute a drive expansion, it will return a successful status to the calling drive, Drive 2. The calling drive, Drive 2, will receive the status, verify that Drive 2 was successful, and then return successful to its calling drive, Drive 3. This process continues until the first drive, Drive 6, in the drive group receives a successful reply, and it then returns a successful reply to the controller. If at any time a failed reply is returned to a drive, that failure will be propagated back to the managing controller for error recovery.

Once the first device returns successful, the drive expansion can begin. The expansion is accomplished by having every drive read its new segment from every other drive in parallel. Unfortunately, if every drive instantly issued read operations to other drives and write operations to itself, much of the data would be overwritten and destroyed.

The management technique employed by the present invention is a segment stack that is stored on every drive. This segment stack represents the list of segments that have been read from the drive. For example, when Drive 5 issues a read_segment( ) operation to Drive 4, Drive 4 will return the read data, and store the segment location onto Drive 4's segment stack. The stack operates as a First In, First Out ("FIFO") queue and the address at the top of the stack indicates the next data segment that needs to be updated.

The segment stack is important because it regulates where a drive is allowed to read data. Every drive can only update a segment that is pulled off of its own segment stack. The one exception to this is the new drive that is being added. Since it does not contain any data, it can update any of its segments. This drive controls the entire process.

Figure 2A:
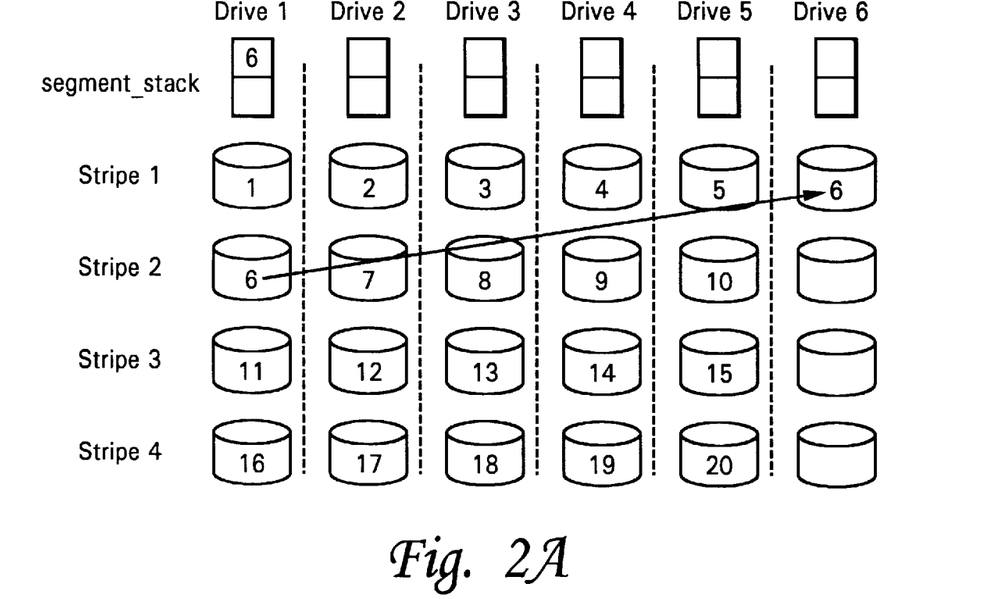
FIGS. 2A–2D illustrates a five drive RAID device, in which a new drive is added, showing several example read and write operations in accordance with a preferred embodiment of the present invention.

FIG, 2A depicts a data transfer operation by new drive, Drive 6. Controller 106 has transferred managing control of the RAID device to Drive 6 and Drive 6 issues a read_ segment(6) command to Drive 1, previously the last drive in the RAID device drive group. Data segment six, read from Drive 1, Stripe 2, is the first segment on the second stripe and contiguous to data segment 5 on Drive 5. Drive 1 returns the read data to Drive 6, Stripe 1 and stores data segment 6 onto its segment stack.

Figure 2B:
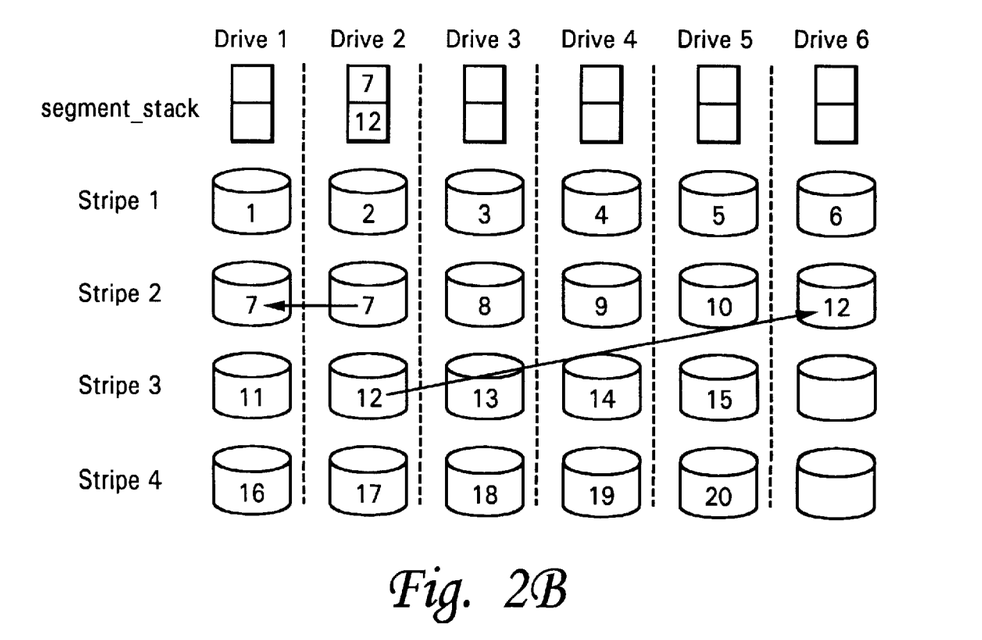

FIG. 2B illustrates the first parallel data transfer in the data transfer process. Drive 1 issues a read_segment(7) operation to Drive 2. Drive 2 returns the read data and stores segment 7 onto its segment stack. Concurrently, Drive 6 is receiving data segment 12, after a read_segment(12) operation from Drive 6 to Drive 2. Drive 2 writes segment 12 to its segment stack.

Figure 2C:
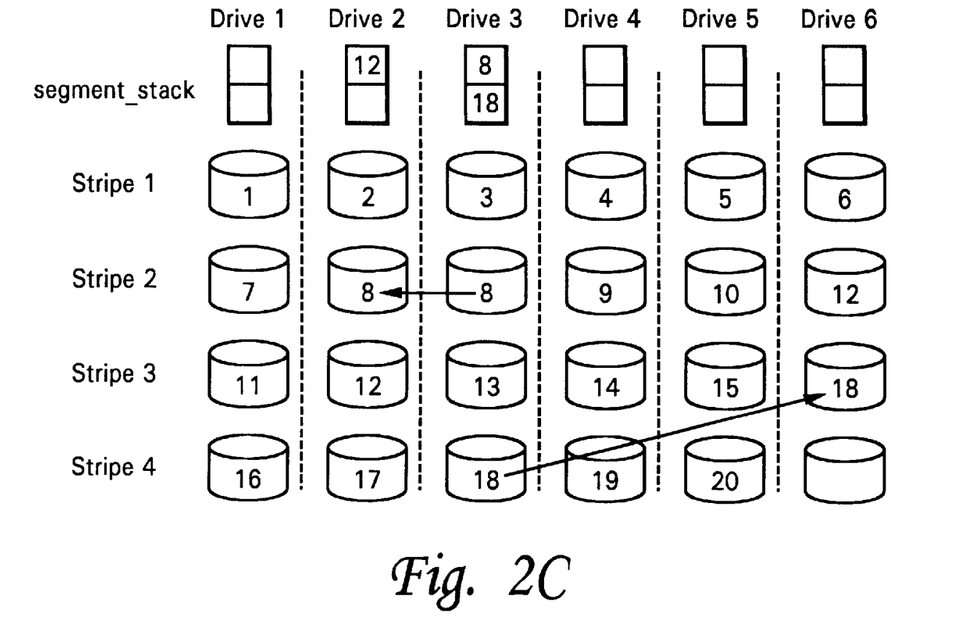

FIG. 2C depicts a parallel data transfer between Drive 2, Drive 3 and Drive 6. Drive 2 transfers data segment 7 to Drive 1 and drops that segment from its segment stack. Segment 12 moves to the top position in the segment stack for Drive 2. Drive 2 receives data segment 8 from Drive 3 and Drive 3 writes segment 8 to its segment stack. At the same time, Drive 6 is receiving data segment 18 from Drive 3. Drive 3 then adds data segment 18 to its segment_stack.

Figure 2D:
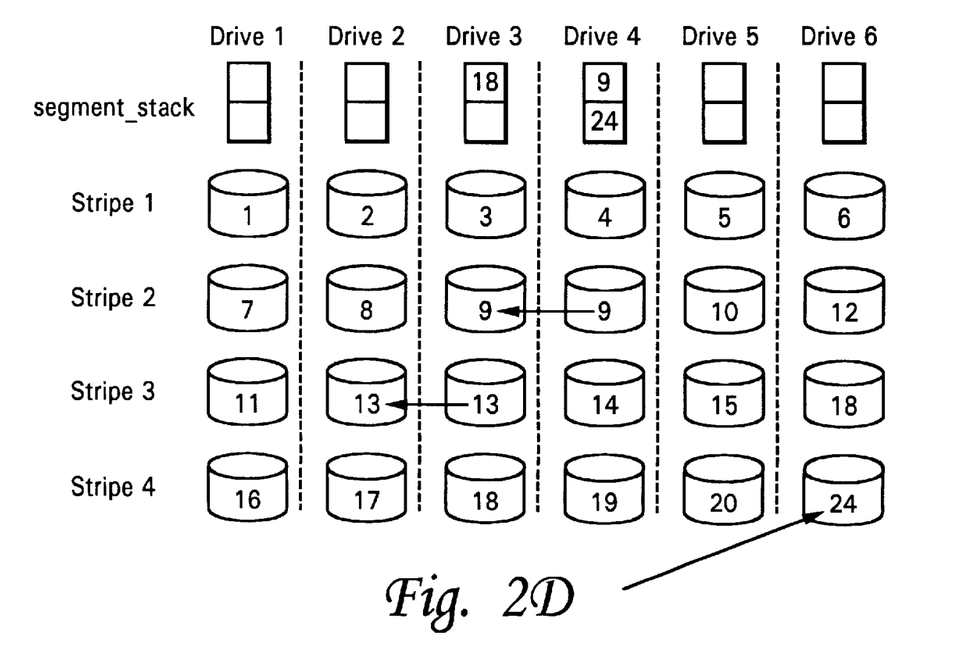

FIG. 2D illustrates the next step in the process, three parallel data transfers between drives. Concurrently, Drive 6, Drive 4 and Drive 3 are transferring data segments. Drive 4, after receiving a read_segment(9) command, writes segment 9 to its segment stack. Concurrently, Drive 4 is transferring data segment 24 to Drive 6 and writing data segment 24 to the Drive 4 segment stack. Drive 2 is receiving data segment 13 from Drive 3. Thus, three operations in parallel by three drives are taking place at the same time.

Figure 3:
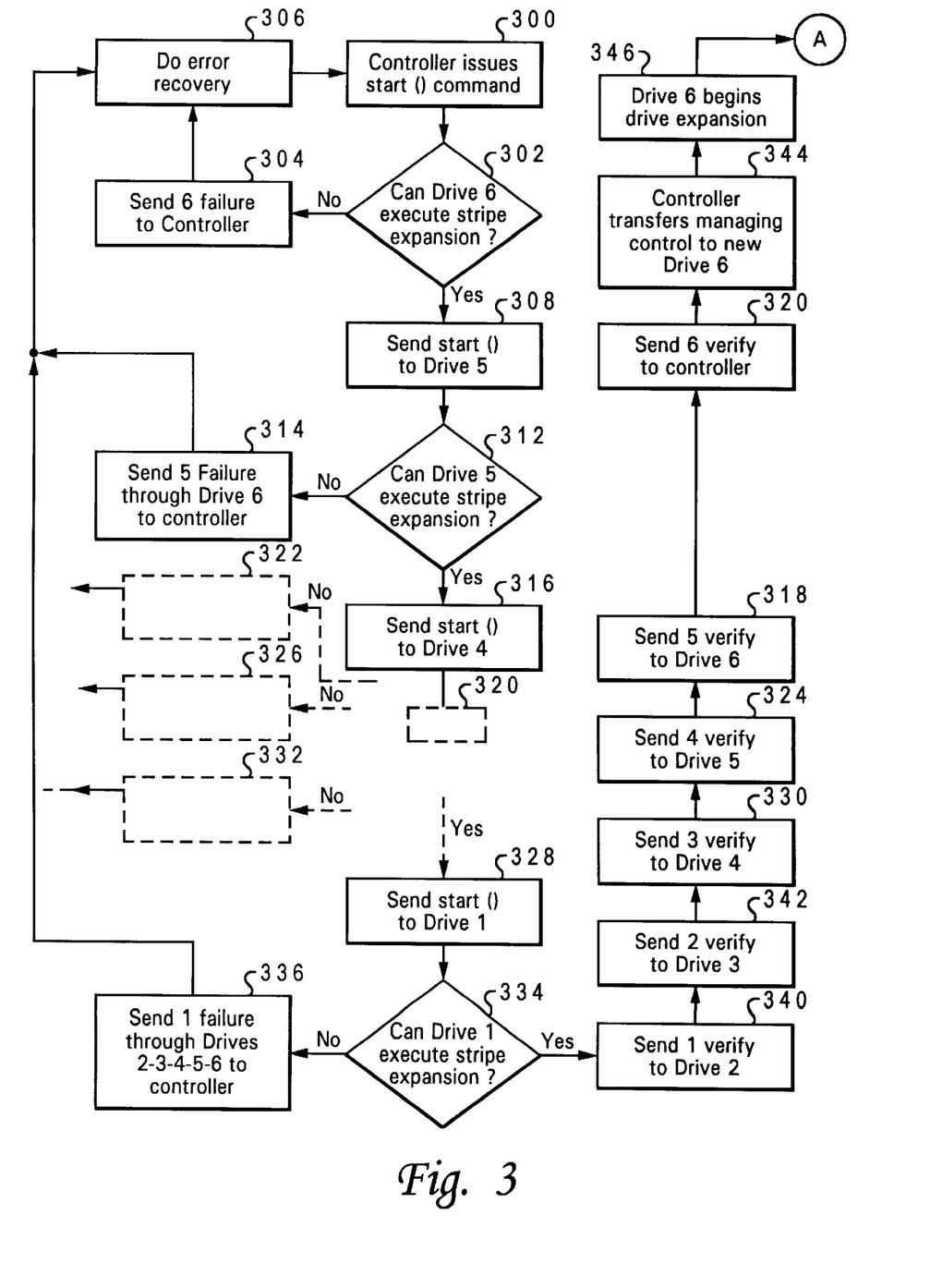
FIG. 3 depicts a flow diagram for startup and transfer of command function between the RAID controller and the RAID device in accordance with a preferred embodiment of the present invention.

With reference to FIG. 3, a high level flow diagram for startup and transfer of command functions between the RAID controller and the RAID device in accordance with a preferred embodiment of the present invention is depicted. The transfer function begins with step 300, which depicts a start command issued by the managing controller to the new drive being added to the group, Drive 6. The process continues in step 302, which illustrates Drive 6 determining whether it is able to execute a stripe expansion. If Drive 6 cannot execute a stripe expansion, the process then proceeds to step 304 which depicts Drive 6 signalling a failure to the controller. The process then passes to step 306, which illustrates error recovery done by the controller. If Drive 6 can execute a stripe expansion, the process instead proceeds to step 308, which illustrates Drive 6, having looked at the drive group parameter list issuing a start command to the drive following Drive 6 in the drive group address list. In this case, the drive following Drive 6 is Drive 5.

The process then proceeds to step 312, which depicts Drive 5 checking to see if it is able to execute a stripe expansion. If Drive 5 cannot execute a strip expansion, the process then proceeds to step 314, which illustrates Drive 5 sending a failure signal to Drive 6. The failure signal is then propagated back through Drive 6 and on to the controller which performs error recovery and reissues the start command. If instead, Drive 5 can execute a stripe expansion, the process then passes to step 316, which depicts Drive 5 sending a start command to Drive 4.

The process continues through each drive on to step 338, repeating the combination of steps until the last drive is reached, step 334. At this point, the final drive in the RAID device, Drive 1, verifies that it can execute a stripe expansion. The process proceeds to step 340, which illustrates Drive 1 sending a verify signal to Drive 2, indicating that Drive 1 can execute a stripe expansion. The process then proceeds to step 342, which depicts Drive 2 sending a verify signal to Drive 3 indicating that Drive 1 and Drive 2 can execute a stripe expansion. The process continues in step 330, which illustrates Drive 3 sending a verify signal to Drive 4 indicating Drive 1, Drive 3, and Drive 4 are able to execute stripe expansions.

Following the verify signal being received by Drive 5 and a subsequent verify signal sent by Drive 5 to Drive 6, the process proceeds to step 334, which depicts the controller transferring managing control to the new drive, Drive 6. The process then passes to step 346, which illustrates Drive 6 beginning the drive expansion.

Figure 4:
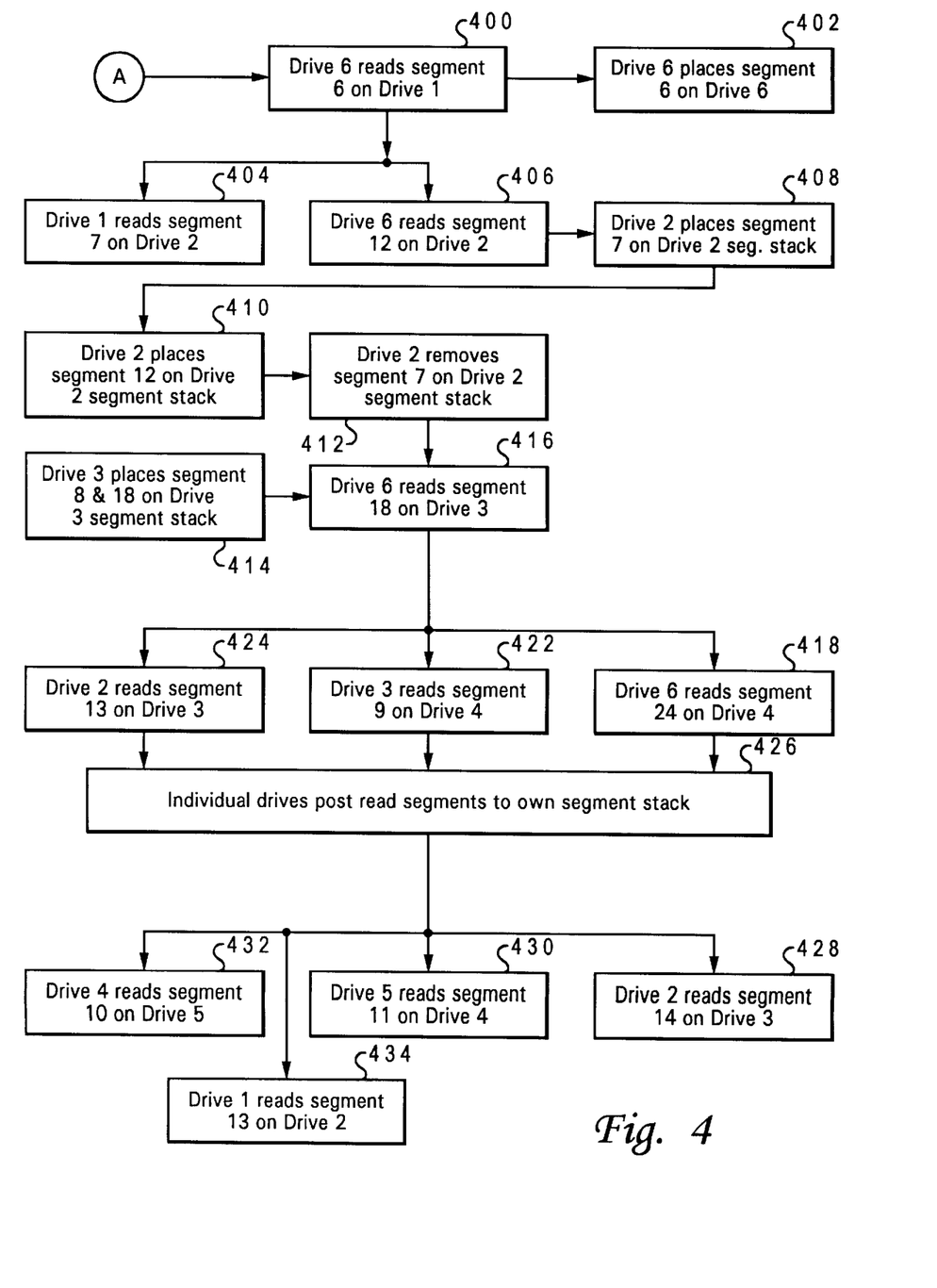
FIG. 4 illustrates a flow diagram for a method for adding a new drive to a RAID device in a data processing system in accordance with a preferred embodiment of the present invention.

Referring to FIG. 4, a flow diagram for a method for adding a new drive to a RAID device in a data processing system in accordance with a preferred embodiment of the present invention is illustrated. The process begins with step 400, which illustrates the new drive, Drive 6 reading segment 6 on Drive 1. The process then proceeds to step 402, which depicts Drive 6 placing segment 6 on Drive 6. At the same time, the process passes to both step 404 and 406 which depict: in step 404 Drive 1 reading segment 7 on Drive 2 and in step 406 Drive 6 reading segment 12 on Drive 2. The process passes next to step 408, which illustrates Drive 2 placing segment 7 on Drive 2's segment stack. Concurrently, the process proceeds to step 410, which depicts Drive 2 placing segment 12 on the Drive 2 segment stack behind segment 7. The process continues to step 412, which illustrates Drive 2 removing segment 7 on the Drive 2 segment stack.

The process then proceeds to step 416, which illustrates Drive 6 reading segment 18 on Drive 3. At the same time, the process passes to step 414, which depicts Drive 3 placing segment 8 and segment 18 onto the Drive 3 segment stack. As Drive 6 reads segment 18 on Drive 3, the process passes to steps 418, 422, and 424 in parallel. The process in step 418, illustrates Drive 6 reading segment 24 on Drive 4. Occurring at the same time, step 22, depicts Drive 3 reading segment 9 on Drive 4. Additionally, step 24 illustrates Drive 2 reading segment 13 on Drive 3. The process then passes to step 426, which illustrates the individual drives, Drive 3, Drive 2, and Drive 6 posting segments that have been read to the segment stack on each drive. The process then proceeds in parallel to step 428, step 430, step 432, and step 434. In this combination of steps, step 428 illustrates Drive 2 reading segment 14 on Drive 3. At the same time, in step 430, Drive 5 reads segment 11 on Drive 4. Drive 4 reads segment 10 on Drive 5 and in conjunction with step 428, step 430, and step 432, step 434, illustrates Drive 1 reading segment 13 on Drive 2.

As illustrated by the flow diagram in FIG. 4, the read and write instructions are occurring in a parallel manner. At a point in the process, every drive is sending read and write instructions to every other drive within the RAID subsystem with an instruction cascade effect. The command functions have been transferred to the new drive, reducing the number of instructions and transactions that involve the controller. Additionally, the instructions and transactions are taking place in parallel between the 6 drives and the controller is left out of the expansion except for polling the drives periodically.

Polling takes place to determine the most recent sector that has been updated. For all host requests that are at or below the updated sector, the controller will execute the host operation as if the drive group has completed the expansion. When it does so, it will mark a bit in the operation to indicate that the controller believes the command is a post-expansion command. If a drive receives a post-expansion command to a sector that has not yet been updated and is not on the segment stack, it will return the command with an error status. If the sector is on the segment stack, then the drive will queue the command up, in its segment stack, for completion after the sector has been updated. If the controller receives a command that needs to be directed to a sector that is above the address returned during a query, it sends the command to the pre-expansion configuration and marks the drive as a pre-expansion command. When the drive receives the command, it determines whether the sector the command is directed towards has been updated. If a sector has been updated or if the sector address is on the segment stack, then the drive will forward the command to the drive that contains the proper sector and act as the second drive's interface to the host.

Figure 5:
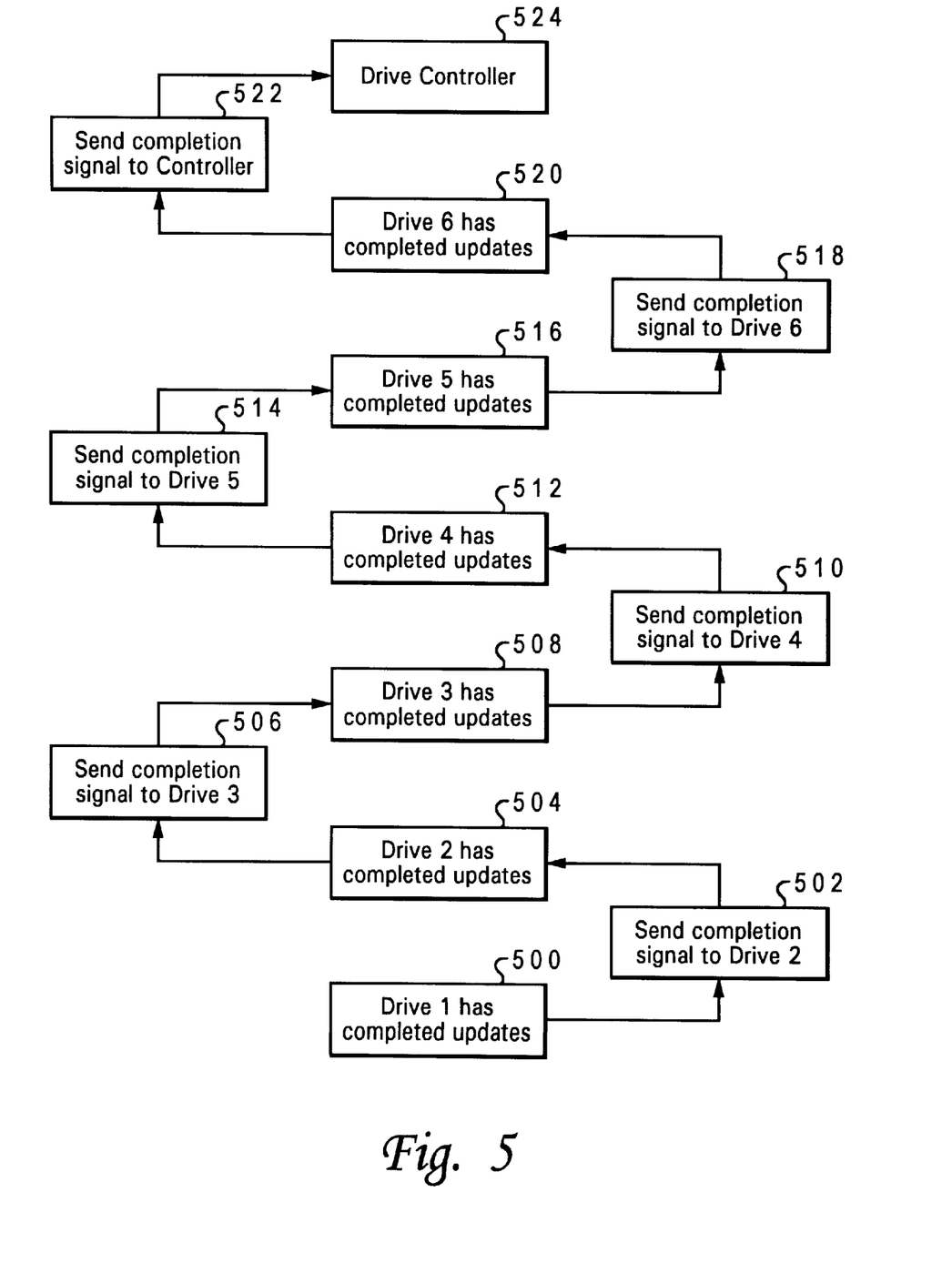
FIG. 5 depicts a flow diagram for the completion process and return of RAID device control to the data processing system's RAID device controller in accordance with a preferred embodiment of the present invention.

Referring now to FIG. 5, a flow diagram for the completion process returning RAID device control to the data processing system's RAID device controller in accordance with a preferred embodiment of the present invention is depicted. The process begins at step 500, which depicts Drive 1 completing all the updates, where Drive 1 is the last drive in the RAID device storage subsystem. The process then proceeds to step 502, which illustrates Drive 1 sending a completion signal to Drive 2. The process next passes to step 504, which depicts Drive 2 confirming completion of its updates. Process then continues to step 506, which illustrates Drive 2 sending a completion signal to Drive 3. The process then passes to step 508, 510, 512, 514, 516, 518, and 520 which illustrates the process being repeated as in step 500, step 502, step 504, and step 506. Step 520 illustrates Drive 6 confirming completion of the updates. The process then passes to step 522, which depicts Drive 6 sending a completion signal to the controller. The process then concludes in step 524, which illustrates the drive controller receiving the completion signal and control passing back to the drive controller.

The method of the present invention reduces the number of transactions that take place between the RAID device controller and a RAID device (the method works equally on a non-RAID drive group and controller storage subsystem), during the installation of a new drive. It accomplishes this reduction in transactions by transferring the installation process from the controller to the new drive. In the prior art, installation is accomplished by the controller executing all of the functions necessary to transfer specific data segments on the various current drives to the new drive. The present invention removes most of the transactions from the controller, moving those to the new drive and leaving the controller to be more or less a monitor of the installation process. The method of the present invention reduces the time to install a new drive to a RAID device by allowing the individual processes to accomplish the installation. The installation is accomplished in parallel with each drive managing the rearrangement of the data segments on every other drive. This frees the controller from managing the rearrangement of the data segments.

The start command of the present invention provides a method to transfer installation commands from the controller to the RAID device. Commands are transferred to the new drive which initiates parallel transfer of data segments by all of the drives in the device.

While the invention has been particularly shown and described with reference to a preferred embodiment, it will be understood by those skilled in the art that various changes in form and detail may be made therein without departing from the spirit and scope of the invention.

What is claimed is:

1. A method for expanding a drive group containing drives ordered in a sequence, first to last, comprising:

installing a new drive as a last drive in the sequence;

determining whether all drives within the drive group are capable of performing stripe expansion by:

issuing a start command to each drive within the drive group, the start command determining whether the respective drive is capable of performing stripe expansion; and receiving a verification response verifying that all drives within the drive group are capable of performing stripe expansion;

responsive to determining that all drives within the drive group are capable of performing stripe expansion, transferring managing control of drive expansion to the drives within the drive group; and initiating a parallel transfer of data segments in all drives in said drive group.

2. The method of claim 1, wherein the step of issuing a start command to each drive within the drive group further comprises:

issuing a start command to the new drive;

responsive to determining that the new drive is capable of performing stripe expansion, propagating the start command to a next drive within a reverse order from the sequence;

for each remaining drive within the drive group except a first drive within the sequence, responsive to receiving the start command and determining that the respective drive is capable of performing stripe expansion, propagating the start command to a next drive within a reverse order from the sequence, and responsive to receiving the start command and determining that the respective drive is not capable of performing stripe expansion, signaling an error condition to a drive controller for the drive group;

for the first drive within the sequence, responsive to receiving the start command and determining that the first drive is capable of performing stripe expansion, returning a verification signal to a drive from which the start command was received, and responsive to receiving the start command and determining that the first drive is not capable of performing stripe expansion, signaling an error condition to the drive controller; and propagating the verification signal through the drive group from drive to drive in the sequence to the new drive.

3. The method of claim 1, wherein the step of issuing a start command to each drive within the drive group further comprises:

ordering every drive address for a drive within drive group in reverse order of the sequence in an address list, wherein an address for the new drive is a first drive address in the address list, an address for the original last drive is a second drive address, and an address for the first drive is a last drive address; and issuing the address list as a parameter within the start command.

4. The method of claim 1, wherein the step of transferring managing control of drive expansion to the drives within the drive group further comprises:

employing a segment stack on each drive to track each segment read from the respective drive;

allowing each drive except for the new drive to update only a segment appearing at the top of the segment stack for the respective drive; and employing the new drive to control segment transfers.

5. The method of claim 4, wherein the step of employing the new drive to control segment transfers further comprises:

using the new drive, reading each of a series of predetermined data segments from another drive within the sequence and writing the first predetermined data segment to the new drive, triggering an update of each predetermined data segment by a drive from which the corresponding data segment was read.

6. The method of claim 5, wherein the step of reading each of a series of predetermined data segments from another drive within the sequence and writing the first predetermined data segment to the new drive further comprises:

reading a data segment determined by AN, wherein A is the sequence number of the data segment to be read and N is the number of data drives in the drive group.

7. The method of claim 5, wherein the step of triggering an update of each predetermined data segment by a drive from which the corresponding data segment was read further comprises:

placing the data segment which was read onto the segment stack;

using the drive from which the data segment was read, reading a replacement data segment determined by AN, wherein A is the sequence number of the data segment to be read and N is the number of data drives in the drive group.

8. The method of claim 7, further comprising:

allowing each drive in the drive group to update data segments from a corresponding segment stack in parallel with other drives;

writing each said data segment read from a drive to the segment stack for that drive; and writing data segments from other drives onto the drive which read the data segment.

9. The method of claim 8, further comprising:

completing transfer of all data segments;

sending a completion signal to the drive controller; and returning managing control back to the drive controller.

10. An apparatus for expanding a drive group containing drives ordered in a sequence, first to last, including a new drive installed as a last drive in the sequence, comprising:

means for determining whether all drives within the drive group are capable of performing stripe expansion including:

means for issuing a start command to each drive within the drive group, the start command determining whether the respective drive is capable of performing stripe expansion; and means for receiving a verification response verifying that all drives within the drive group are capable of performing stripe expansion;

means, responsive to determining that all drives within the drive group are capable of performing stripe expansion, for transferring managing control of drive expansion to the drives within the drive group; and mean for initiating a parallel transfer of data segments in all drives in said drive group.

11. The apparatus of claim 10, wherein the means for issuing a start command to each drive within the drive group further comprises:

means for issuing a start command to the new drive;

means, responsive to determining that the new drive is capable of performing stripe expansion, for propagating the start command to a next drive within a reverse order from the sequence;

means, for each remaining drive within the drive group except a first drive within the sequence, for propagating the start command to a next drive within a reverse order from the sequence in response to receiving the start command and determining that the respective drive is capable of performing stripe expansion, and for signaling an error condition to a drive controller for the drive group in response to receiving the start command and determining that the respective drive is not capable of performing stripe expansion;

means, for the first drive within the sequence, for returning a verification signal to a drive from which the start command was received in response to receiving the start command and determining that the first drive is capable of performing stripe expansion, and for signaling an error condition to the drive controller in response to receiving the start command and determining that the first drive is not capable of performing stripe expansion; and means for propagating the verification signal through the drive group from drive to drive in the sequence to the new drive.

12. The apparatus of claim 10, wherein the means for issuing a start command to each drive within the drive group further comprises:

means for ordering every drive address for a drive within drive group in reverse order of the sequence in an address list, wherein an address for the new drive is a first drive address in the address list, an address for the original last drive is a second drive address, and an address for the first drive is a last drive address; and means for issuing the address list as a parameter within the start command.

13. The apparatus of claim 10, wherein the means for transferring managing control of drive expansion to the drives within the drive group further comprises:

a segment stack on each drive employed to track each segment read from the respective drive;

means for allowing each drive except for the new drive to update only a segment appearing at the top of the segment stack for the respective drive; and means for employing the new drive to control segment transfers.

14. The apparatus of claim 13, wherein the means for employing the new drive to control segment transfers further comprises:

means, using the new drive, for reading each of a series of predetermined data segments from another drive within the sequence and writing the first predetermined data segment to the new drive, triggering an update of each predetermined data segment by a drive from which the corresponding data segment was read.

15. The apparatus of claim 14, wherein the means for reading each of a series of predetermined data segments from another drive within the sequence and writing the first predetermined data segment to the new drive further comprises:

means for reading a data segment determined by AN, wherein A is the sequence number of the data segment to be read and N is the number of data drives in the drive group.

16. The apparatus of claim 14, wherein the means for triggering an update of each predetermined data segment by a drive from which the corresponding data segment was read further comprises:

means for placing the data segment which was read onto the segment stack;

means, using the drive from which the data segment was read, for reading a replacement data segment determined by AN, wherein A is the sequence number of the data segment to be read and N is the number of data drives in the drive group.

17. The apparatus of claim 16, further comprising:

means for allowing each drive in the drive group to update data segments from a corresponding segment stack in parallel with other drives;

means for writing each said data segment read from a drive to the segment stack for that drive; and means for writing data segments from other drives onto the drive which read the data segment.

18. The apparatus of claim 17, further comprising:

means for completing transfer of all data segments;

means for sending a completion signal to the drive controller; and means for returning managing control back to the drive controller.

19. A data drive, comprising:

a connection for coupling the data drive to a drive controller;

a segment stack;

means, responsive to receiving a start command, for passing the start command to a next drive in a sequence within an ordered address list contained in the start command;

means, responsive to receiving a verification response, for propagating the verification response to a next drive in a reverse order from the sequence;

means, responsive to receiving a read command for a data segment, for providing the data segment and adding the data segment to the segment stack; and means, responsive to a segment being placed within the segment stack, for reading a replacement segment from another data drive.

* * * * *